May 5, 1936.  A. L. HESTON  2,039,531

TELESCOPIC TIRE BUILDING DRUM

Filed July 17, 1929  3 Sheets-Sheet 3

INVENTOR.
ALLEN L. HESTON.
BY Ely & Barrow
ATTORNEYS

Patented May 5, 1936

2,039,531

UNITED STATES PATENT OFFICE 2,039,531

TELESCOPIC TIRE BUILDING DRUM

Allen L. Heston, Columbiana, Ohio, assignor to The National Rubber Machinery Company, Akron, Ohio, a corporation of Ohio Application July 17, 1929, Serial No. 378,934

30 Claims. (Cl. 154—9)

The present invention relates to apparatus for use in the construction of pneumatic tires and particularly to tire building drums, such as used in the manufacture of the unvulcanized tire carcass in the "flat" form or drum built form.

The invention has for its object the production of a practical and operative drum which is made up of a plurality of continuous annular sections, so arranged and disposed with respect to one another that the drum can be reduced in width to a sufficient extent to permit the tire to be removed. Heretofore, the commonly used type of collapsible tire building drum has been made in a plurality of segments, one of which is movable radially inward to perform the collapsing operation, the remaining sections being usually hinged together. Other forms have been made and operated upon this collapsing principle, but have employed a radially movable segment. The construction of these drums is quite expensive, and in addition the maintenance required to keep the drums in proper working order has been a very substantial item. By constructing the drum of a plurality of continuous annular sections which are telescopically mounted, the expense in construction and maintenance of these drums is greatly reduced.

As a further substantial advantage, the operation of stripping or removing the finished tire from the drum and reassembling it is greatly expedited over the old method, the invention as shown herein permitting the drum to be collapsed or expanded by the rotation of the drum carrying shaft, while the drum is held stationary.

The present invention also permits the drum to be readily adjusted for different widths of tire beads, so that with a single drum, it is possible to make the entire range of tires of a common diameter but differing cross sections.

In the drawings the best known and preferred form of the invention is shown, but it is apparent that the invention may be embodied in other and different forms without departing from the essential features thereof within the scope of the invention as set forth in the appended claims.

Figure 1:
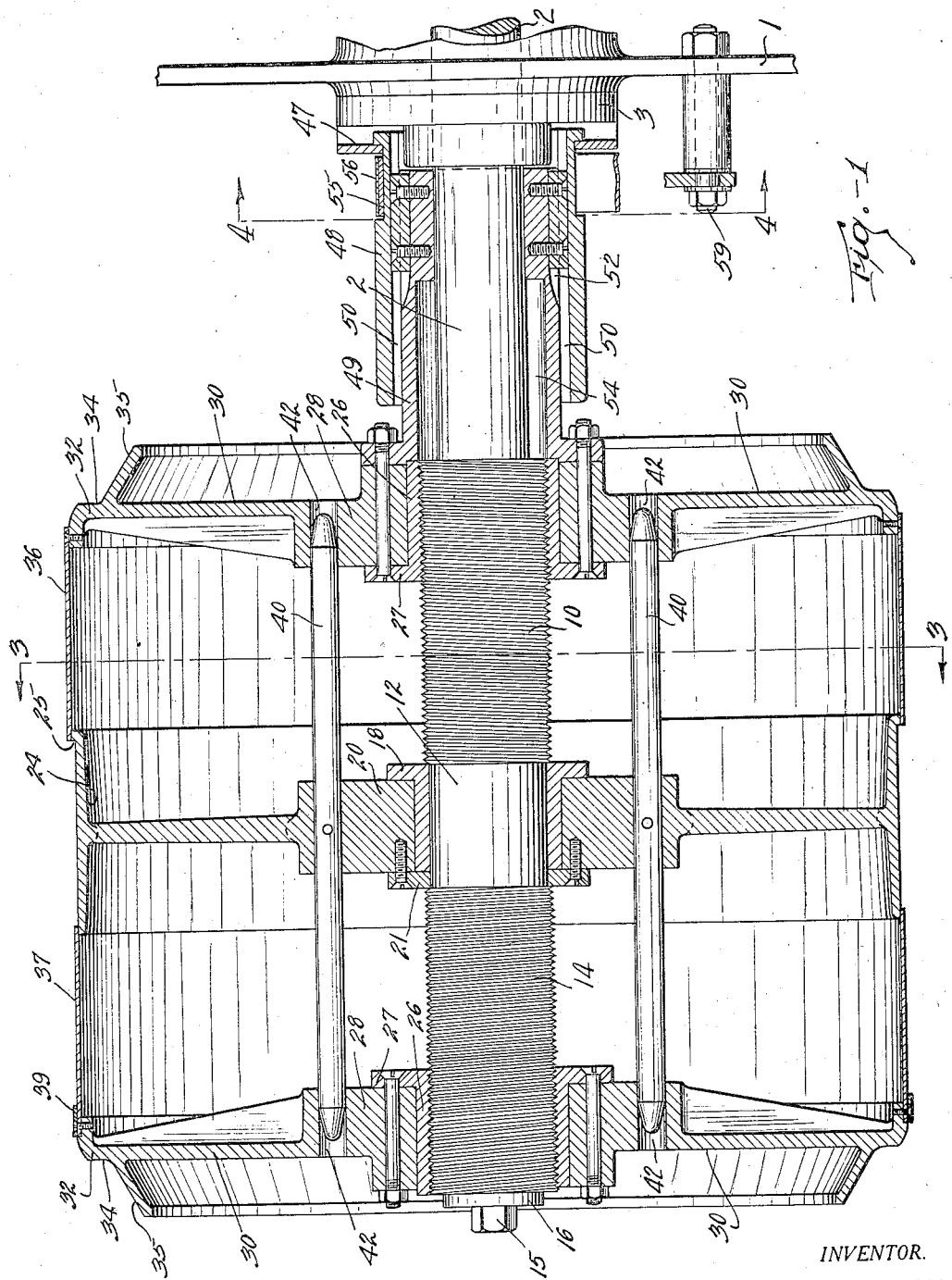
Figure 1 is a longitudinal section through the improved tire building drum expanded for the tire building operation, the section being taken on the line 1—1 of Figure 3.

In the drawings the frame of the tire building machine or stand is shown at 1, in which is the main or power shaft 2 supported in a bearing 3 in the stand and projecting outwardly therefrom. This shaft is adapted to be driven in opposite directions by any suitable driving mechanism not shown.

The outer end of the shaft is provided with a reduced portion 6 having an elongated keyway 7 therein. Fitting over the reduced portion of the shaft and held in position against the shoulder 8 therein is a screw threaded sleeve 10. At the end of the sleeve 10 is a circular bearing sleeve 12 and beyond the bearing sleeve is a second screw threaded sleeve 14. The sleeves 10, 12, and 14 are retained on the shaft by a bolt 15 screwed onto the shaft and bearing against a collar or plate 16. The sleeves are keyed to the shaft 2 by the elongated key 17 fitting in the keyway 7 and in corresponding keyways in the sleeves. The screw threads on the sleeve 10 are in one direction and the threads on the sleeve 14 are in the opposite direction.

Fitted over the sleeve 12 and adapted to rotate thereon, is the flanged collar 18 on which is mounted the hub 20 of the drum, a plate or ring 21 securing the hub in position. On the hub is supported the main or central portion of the tire building drum which is indicated by the numeral 24, this portion having a raised rib or flange 25 along one side thereof.

Figure 2:
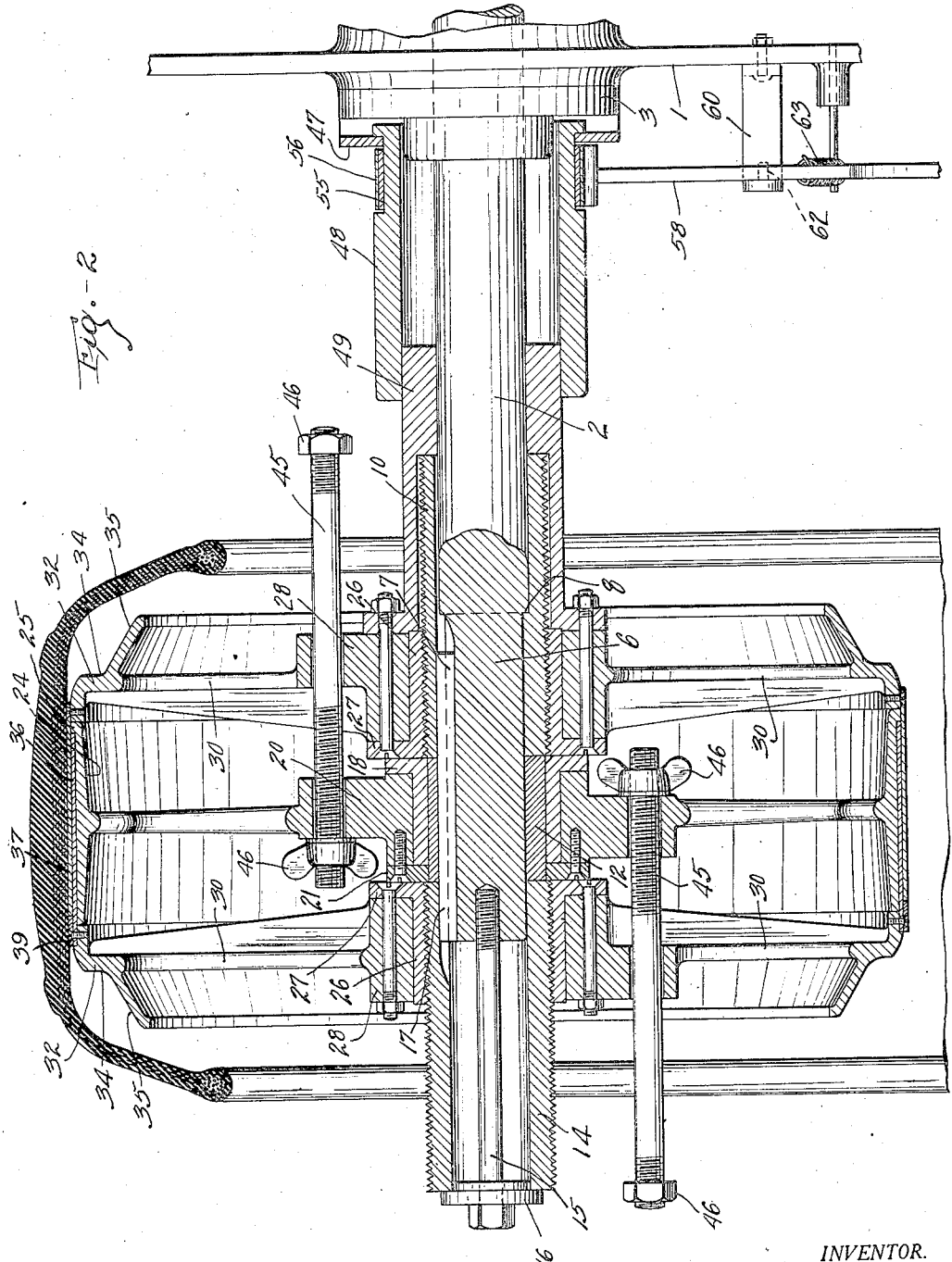
Figure 2 is a similar view showing the drum contracted for removal of the tire, a tire carcass being shown therein.
Figure 3:
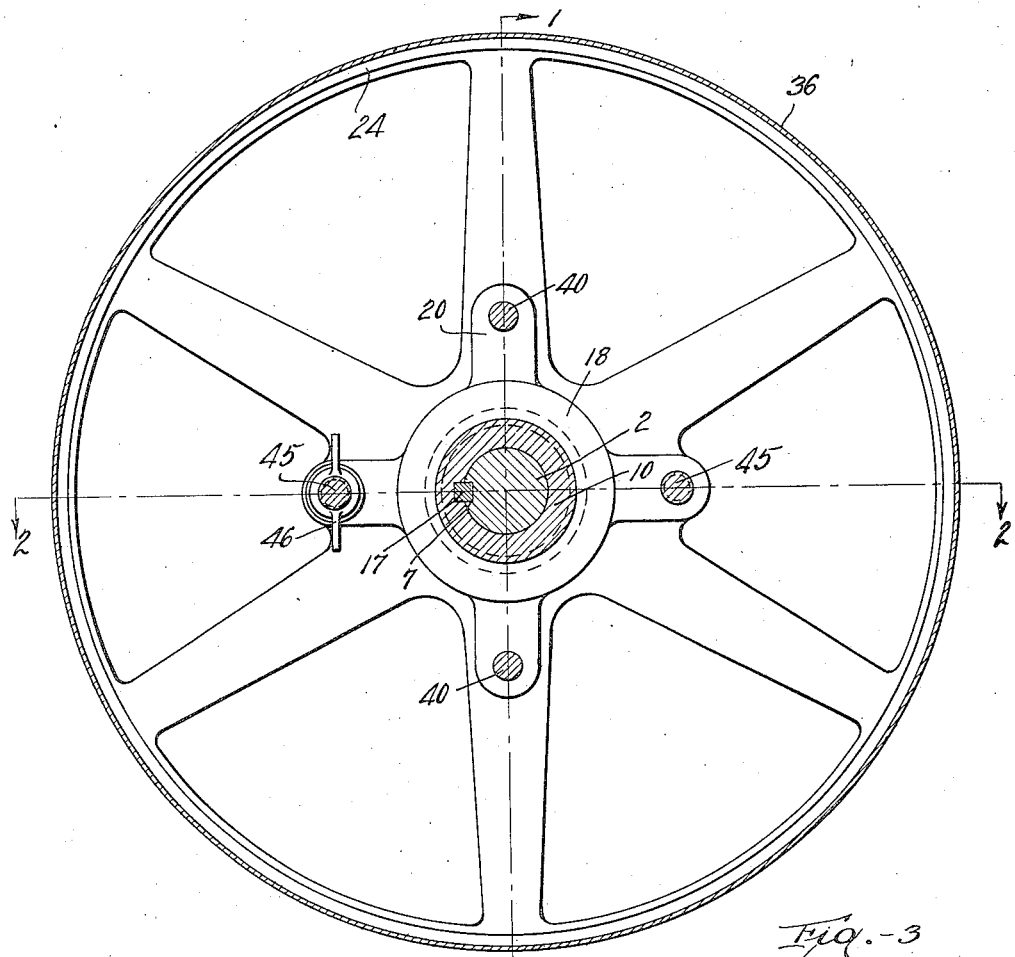
Figure 3 is a section on the line 3—3 of Figure 1.
Figure 4:
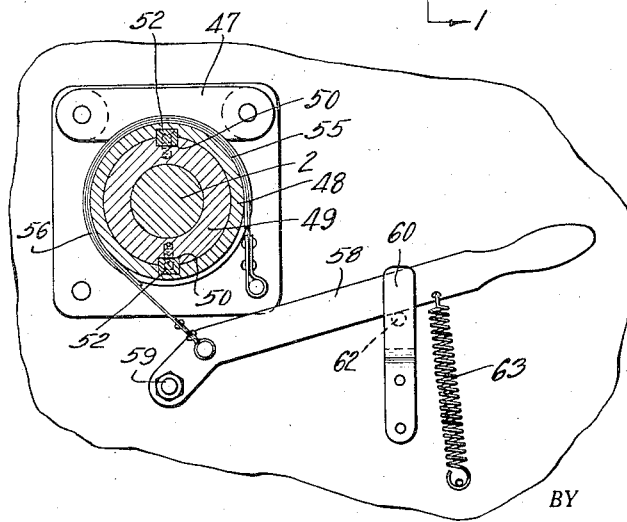
Figure 4 is a detail of the drum holding device being a section on the line 4—4 of Figure 1.

Threaded on the sleeves 10 and 14 are two sleeves 26, which are provided with facing flanges 27 and on the sleeves are secured the hub members 28, each of which is provided with spokes 30 which extend to the outer ring shaped members 32. Each of these members is formed with an inwardly positioned bead seat 34 upon which the beads of the tires are seated, and aprons 35 for supporting the skirts of the fabric, which are to be turned over the beads. Attached to the inner faces of the rings 32 are annular sheet metal extensions 36 and 37 which, when the drum is expanded to building width, overlap the edges of the central ring 24. It will be observed that one of the extensions, 36, rests upon the rib 25, while the other extension 37 is somewhat smaller and rests upon the main body of the drum. The purpose of this construction is to enable the two sections 36 and 37 to overlap one another when the drum is contracted, both of the sections overlying the central ring 24, as shown in Figure 2. In order to compensate for the difference in outer diameter, a thin metal band 39 is secured to the outer edge of the extension 37 so that the fabric will be properly applied on both sides of the drum.

It will be observed that when the shaft 2 and the threaded sleeves carried thereby are rotated relative to the drum that the hub members will approach or recede according to the direction of rotation. In order to guide the outer sections of the drum, long pins 40 are located in the hub 20 and are receivable in the guiding apertures 42 in the hubs 28.

To provide an adjustable stop for determining the maximum extent of expansion of the drum, threaded shafts 45 are located diametrically opposite in the hub 20 and extended through the hubs 28, the ends of the shafts being provided with nuts 46, which abut the respective hub members and thus limit the expansion of the drum.

In order to hold the drum stationary while the shaft 2 is rotated a detent is provided in the form of a rotatable sleeve 48 which is mounted in a casing 47 on the bearing 3 and surrounds the shaft, this sleeve being of sufficient length to overlap a sliding sleeve 49 which is secured to the side of the inner hub 28. The inner surface of sleeve 48 is provided with keyways 50 and the sleeve 49 with keys 52. The sleeve 49 is provided with a counter bore 54 to receive the threaded sleeve 10. On the outer surface of the sleeve 48 is a braking surface 55 in which is received the contractible brake band 56, one end of which is fastened to the casing 47, and the other end to a lever 58, pivoted at 59 and receivable in a bracket 60 in the frame of the machine. A stop 62 on the inside of the bracket 60 keeps the lever raised and the brake band out of contact during the building of a tire when the shaft and drum rotate in unison. When the lever is shifted off the stop a coil spring 63 assists the operator in applying the required pressure on the brake band to hold the sleeve 48 from rotation.

The operation and advantage of the improved tire building drum will be readily understood and appreciated. When the drum is in expanded position as shown in Figure 1, it is in condition to have the tire built thereon. The width of the drum is fixed and adjusted by the location of the nuts 46 on the bolts, these operating as fixed stops which determine the maximum width to which the drum can be expanded. The desired width of tire to be built and therefore the cross section can thus be varied so that a large range of sizes of a single bead diameter can be constructed on one drum. When in this expanded position the tire is built up in the usual manner, the shaft and the drum being rotated in unison, the beads being seated on the reduced bead seats as is customary. In this operation the direction of rotation of the shaft is such as to tend to expand or spread the movable drum sections which is resisted by the stops and therefore, the drum is maintained in expanded position.

When the tire is completed it cannot of course be removed from the drum in expanded condition for the reason that the inextensible beads are less in diameter than the outer face of the drum. For the purpose of removing the tire, the rotation of the shaft 2 is reversed and the brake is applied, holding the sleeves 48 and 49 from rotation. This also holds the drum sections from rotation and the screws 10 and 14 move the outer sections inwardly until they abut the central section, in which position the two sheet metal drum sections overlap each other and overlap the central section as shown in Figure 2. When the drum is in this position, one side of the drum may be received in the tire between the beads as shown in Figure 2 and the opposite side swung outwardly to free the tire from the drum whereupon the whole tire casing may be lifted off the building drum. The drum is then expanded by rotation of the shaft in the opposite direction while the sleeve 48 is held stationary.

The invention is described and illustrated herein in considerable detail, but it will be understood that changes and modifications may be made within the scope thereof without departing from the essential features thereof. The specific arrangement of the two side sections and the central stationary section may be varied and altered. The improved drum permits of more rapid removal of the finished tire carcass and as the several parts of the drum are in the form of integral annular rings, there are no loose or movable parts to get out of place either due to centrifugal force or in the operation of collapsing or reerecting the drum.

What is claimed is:

1. A tire building drum having side sections movable toward and from one another, oppositely threaded screws, each in engagement with the side sections, and means to cause the approach or withdrawal of the side sections by causing relative rotation of the sections and the screws.

2. A tire building drum having side sections movable toward and from one another, each side section consisting of an outer ring with a reduced bead seat thereon and an extension to constitute a portion of the tire building surface, oppositely threaded screws, each in engagement with the side sections, and means to cause the approach or withdrawal of the side sections by causing relative rotation of the sections and the screws.

3. A tire building drum having a continuous annular side section, means to rotate the drum, a screw in engagement with the side section and means for causing the side section to move along the screw.

4. A tire building drum having a continuous, annular, movable side section, a rotatable shaft for rotating the drum, said shaft being rotatable relatively of the drum, and means for converting the rotary movement of the shaft relatively of the drum, into lateral movement of the side section.

5. A tire building drum having a continuous, annular, movable side section, a rotatable shaft for rotating the drum, and means for converting the rotary movement of the shaft into lateral movement of the side section, said means comprising a feed screw in engagement with the section, and means for rotating the feed screw in the side section.

6. A tire building drum having a continuous, annular, movable side section, a rotatable shaft for rotating the drum, and means for converting the rotary movement of the shaft into lateral movement of the side section, said means comprising a feed screw in engagement with the section, and fixed to the shaft, and a detent for holding the section while the shaft is rotated.

7. A tire building drum comprising a central section and two side sections on opposite sides thereof, a shaft, oppositely turned screws on the shaft and in engagement with the side sections, and a detent connected to a side section to prevent its rotation.

8. A tire building drum comprising a central section and two side sections on opposite sides thereof, a shaft, the drum being rotatable thereby and thereon, oppositely turned screws on the shaft and in engagement with the side sections and a detent connected to a side section to prevent its rotation.

9. A tire building drum comprising a power shaft, a drum section rotatively mounted thereon, a second drum section having a portion thereof movable into telescopic relation to the first named section, a screw fixed to the shaft and in engagement with the second section and a detent to restrain the sections from rotation with the shaft.

10. A tire building drum comprising a power shaft, a drum section rotatively mounted thereon, a second drum section having a portion thereof movable into telescopic relation to the first named section, a screw fixed to the shaft and in engagement with the second section and a detent to restrain the sections from rotation with the shaft and a stop adapted to limit the expansion of the sections and thereby cause the drum as a whole to rotate in unison with the shaft.

11. A tire building drum comprising a power shaft, a drum section rotatably mounted thereon in a fixed position, side sections on opposite sides of the fixed section, annular extensions on the side sections overlapping the fixed section, and movable into telescopic relation to one another, a reversely threaded screw fixed to the shaft and in engagement with the side sections and a detent to restrain the movement of the drum sections while the shaft is rotated.

12. A tire building drum comprising a power shaft, a drum section rotatably mounted thereon in a fixed position, side sections on opposite sides of the fixed section, annular extensions on the side sections overlapping the fixed section, and movable into telescopic relation to one another, a reversely threaded screw fixed to the shaft and in engagement with the side sections and a detent to restrain the movement of the drum sections while the shaft is rotated and a stop adapted to limit the expansion of the side sections and thereby cause the drum as a whole to rotate with the shaft.

13. A rotary, collapsible, tire building drum, a shaft to rotate and to expand and collapse the drum, and means to retard the drum to cause the shaft to expand or collapse the drum.

14. A rotary, collapsible, tire building drum, a shaft to rotate and to collapse the drum, and means to retard the drum to cause the shaft to collapse the drum.

15. A rotary, collapsible, tire building drum, a shaft to rotate and to expand the drum, and means to retard the drum to cause the shaft to expand the drum.

16. A rotary, collapsible, tire building drum, a shaft to rotate the drum, connections between the shaft and the drum for positively expanding and collapsing the same upon relative rotation of the shaft and drum, and means for retarding the drum to produce such relative rotation.

17. A rotary, collapsible, tire building drum, a shaft to rotate the drum, connections between the shaft and the drum for positively collapsing the same upon relative rotation of the shaft and drum, and means for retarding the drum to produce such relative rotation.

18. A rotary, collapsible, tire building drum, a shaft to rotate the drum, connections between the shaft and the drum for positively expanding the same upon relative rotation of the shaft and drum, and means for retarding the drum to produce such relative rotation.

19. A collapsible tire building form comprising a power driven shaft for supporting and rotating the form, a sleeve over the shaft, and rotatable therewith or relative thereto, connections from the shaft and sleeve to the form for positively expanding and collapsing the form upon relative rotation of the shaft and sleeve, said connections being constructed to hold the form expanded while the shaft and sleeve are rotating in unison or are in a state of rest, and a friction brake surrounding the sleeve to retard the sleeve to effect such relative rotation.

20. A collapsible tire building form comprising as one member a power driven shaft for supporting and rotating the form and as another member a sleeve over the shaft rotatable in unison with the shaft or relative thereto, connections from the shaft to the form and from the sleeve to the form for holding the form expanded while said shaft and sleeve are rotating in unison or are in a state of rest and for positively collapsing said form upon relative rotation of the shaft and sleeve, and a friction brake associated with one of said members operable at will for retarding rotation thereof while the other continues to rotate to effect such relative rotation.

21. A collapsible tire building form comprising a power driven shaft for supporting and rotating the form, a sleeve having permanent driving connection with the form so as to rotate over the shaft and rotatable therewith when the form is operated, a brake surrounding the sleeve, means to apply the brake to the sleeve to retard rotation of the form, and mechanism operable when the brake is applied to the sleeve to collapse the form.

22. The combination of a collapsible tire building form, a power driven shaft for supporting and rotating the form, said shaft being rotatable relatively of the form, a sleeve over the shaft rotatable in unison with the form through the agency of a permanent connection therewith, a friction brake associated with said sleeve to retard the rotation of the sleeve and form while the shaft continues its rotation, and collapsing mechanism for the form operable by retardation of the sleeve.

23. A rotary, sectional, tire band building form collapsible to strip the sections from inner surfaces of a tire built thereon, a driving shaft carrying said form, a brake wheel for collapsing said form while the latter is in rotation, and a friction brake member for retarding said wheel to collapse the form whereby a tire may be removed therefrom.

24. A rotary, sectional, tire building form collapsible to strip the sections from inner surfaces of a tire built thereon, relatively rotatable, concentric members including a driving shaft carrying said form, one of said members being retardable with respect to the other for collapsing the form while the latter is in rotation, and means operative at will during rotation of said form for retarding said retardable member to collapse the form whereby a tire may be removed therefrom.

25. A rotary, sectional drum, a driving shaft carrying said drum, rotary means surrounding and rotatable about the shaft and retardable to collapse said drum to strip the sections from inner surfaces of a tire band built on said drum, and a brake operable at will for retarding said rotary means to collapse the form whereby a tire may be removed therefrom.

26. A tire building form collapsible to strip the form from inner surfaces of a tire built thereon and comprising a power driven shaft for supporting and rotating the form, a sleeve rotatable over the shaft and rotatable therewith when the form is operated, a brake surrounding the sleeve, means to apply the brake to the sleeve, and mechanism operable when the brake is applied to the sleeve to collapse the form whereby a tire may be removed therefrom.

27. The combination of a tire building form collapsible to strip the form from inner surfaces of a tire built thereon, a power driven shaft for supporting and rotating the form, a sleeve over the shaft rotatable in unison with the shaft or relative thereto, a friction brake associated with said sleeve to retard the rotation thereof while the shaft continues its rotation, and collapsing mechanism for the form operable by retardation of the sleeve to collapse the form whereby a tire may be removed therefrom.

28. The combination in a collapsible tire building form of relatively movable members for operating a plurality of form sections to strip the form from inner surfaces of a tire built thereon, one of said members comprising a power actuated shaft, said other member being adapted to be held against rotation with said shaft, and connections between said members and the form sections for collapsing the same to permit removal of a tire therefrom when said shaft is power driven while said other member is held, said other member being adapted to permit indeterminate rotation of said shaft when the form is collapsed.

29. The combination in a tire building form including a plurality of sections collapsible to permit removal of a tire from the form, relatively rotatable members supporting the drum including a power driven shaft, connections from said members to said sections for collapsing by a single operation all the collapsible sections of said form upon relative rotation of said members to strip the same from inner surfaces of a tire built thereon and to permit said removal of the tire therefrom, and means operable at will during rotation of the form for effecting relative rotation of said members.

30. The combination in a tire building form including a plurality of sections collapsible to permit removal of a tire from the form, relatively rotatable members supporting the drum including a power driven shaft, connections from said members to said sections for collapsing by a single operation all the collapsible sections of said form upon relative rotation of said members to strip the same from inner surfaces of a tire built thereon and to permit said removal of the tire therefrom, and means operable at will during rotation of the form for effecting relative rotation of said members, said means constituting a friction brake for retarding rotation of one of said members.

ALLEN L. HESTON.